(12) United States Patent
Song et al.

(10) Patent No.: US 8,872,473 B2
(45) Date of Patent: Oct. 28, 2014

(54) SYSTEM FOR RECHARGING PLUG-IN HYBRID VEHICLE BY CONTROLLING PRE-CHARGE OF A DC LINK

(75) Inventors: Hong Seok Song, Seongnam (KR); Ki Young Jang, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 12/960,838

(22) Filed: Dec. 6, 2010

(65) Prior Publication Data

US 2012/0007552 A1     Jan. 12, 2012

(30) Foreign Application Priority Data

Jul. 9, 2010   (KR) .................. 10-2010-0066376

(51) Int. Cl.
*H02J 7/00*       (2006.01)
*B60L 7/14*       (2006.01)
*B60L 11/12*      (2006.01)
*B60L 11/14*      (2006.01)
*B60L 11/18*      (2006.01)

(52) U.S. Cl.
CPC .......... *B60L 11/1816* (2013.01); *Y02T 10/7022* (2013.01); *B60L 2200/36* (2013.01); *B60L 7/14* (2013.01); *Y02T 10/7005* (2013.01); *Y02T 10/7077* (2013.01); *Y02T 10/6217* (2013.01); *B60L 11/123* (2013.01); *B60L 2200/10* (2013.01); *Y02T 90/121* (2013.01); *B60L 11/14* (2013.01); *Y02T 10/7233* (2013.01); *B60L 2210/12* (2013.01); *B60L 2210/40* (2013.01); *B60L 2210/14* (2013.01); *Y02T 10/641* (2013.01); *Y02T 10/646* (2013.01); *Y02T 10/7088* (2013.01); *B60L 11/185* (2013.01); *B60L 2200/32* (2013.01); *B60L 2220/54* (2013.01); *B60L 11/1814* (2013.01); *Y02T 10/7225* (2013.01); *Y02T 10/7241* (2013.01); *B60L 2270/20* (2013.01); *Y02T 90/128* (2013.01); *Y02T 10/648* (2013.01); *Y02T 90/127* (2013.01); *Y02T 90/14* (2013.01)
USPC ........................................................ 320/109

(58) Field of Classification Search
CPC .................................................. B60L 2270/20
USPC ........................................................ 320/109
See application file for complete search history.

(56) References Cited

U.S. PATENT DOCUMENTS 6,128,204 A * 10/2000 Munro et al. .................... 363/41
7,023,107 B2 * 4/2006 Okuda et al. ................. 307/10.1
7,400,616 B2 * 7/2008 Saito et al. ..................... 370/349
7,825,616 B2 * 11/2010 Clark et al. ..................... 318/139

(Continued)

FOREIGN PATENT DOCUMENTS

| JP | 09-154236 A | 6/1997 |
|---|---|---|
| JP | 2007-196967 A | 8/2007 |
| JP | 2007-318970 A | 12/2007 |
| JP | 2009-065728 A | 3/2009 |

(Continued)

*Primary Examiner* — Yalkew Fantu
*Assistant Examiner* — Manuel Hernandez
(74) *Attorney, Agent, or Firm* — Edwards Wilman Palmer LLP; Peter F. Corless

(57) ABSTRACT

A system for recharging a battery in a hybrid vehicle provided with two motor is provided. If connection of a recharging connector (recharging stand) is detected, an initial activation of a controller is performed, and a DC link is pre-recharged. If the DC link is pre-recharged to a voltage higher than or equal to a predetermined voltage, an exterior AC or DC electricity is supplied to the battery so as to recharge the battery according to the present invention.

2 Claims, 4 Drawing Sheets

(56) References Cited

U.S. PATENT DOCUMENTS

| | | | |
|---|---|---|---|
| 8,301,322 B2 * | 10/2012 | Mitsutani | 701/22 |
| 2003/0029654 A1 * | 2/2003 | Shimane et al. | 180/65.4 |
| 2009/0108674 A1 * | 4/2009 | Ozaki et al. | 307/10.6 |
| 2010/0299008 A1 | 11/2010 | Mitsutani | |
| 2011/0043355 A1 * | 2/2011 | Chander et al. | 340/455 |

FOREIGN PATENT DOCUMENTS

| | | |
|---|---|---|
| JP | 2009-065808 A | 3/2009 |
| JP | 2009-100565 A | 5/2009 |
| KR | 10-2006-0018703 A | 3/2006 |
| WO | 2009-034878 A1 | 3/2009 |
| WO | WO 2009034878 A1 * | 3/2009 |

* cited by examiner

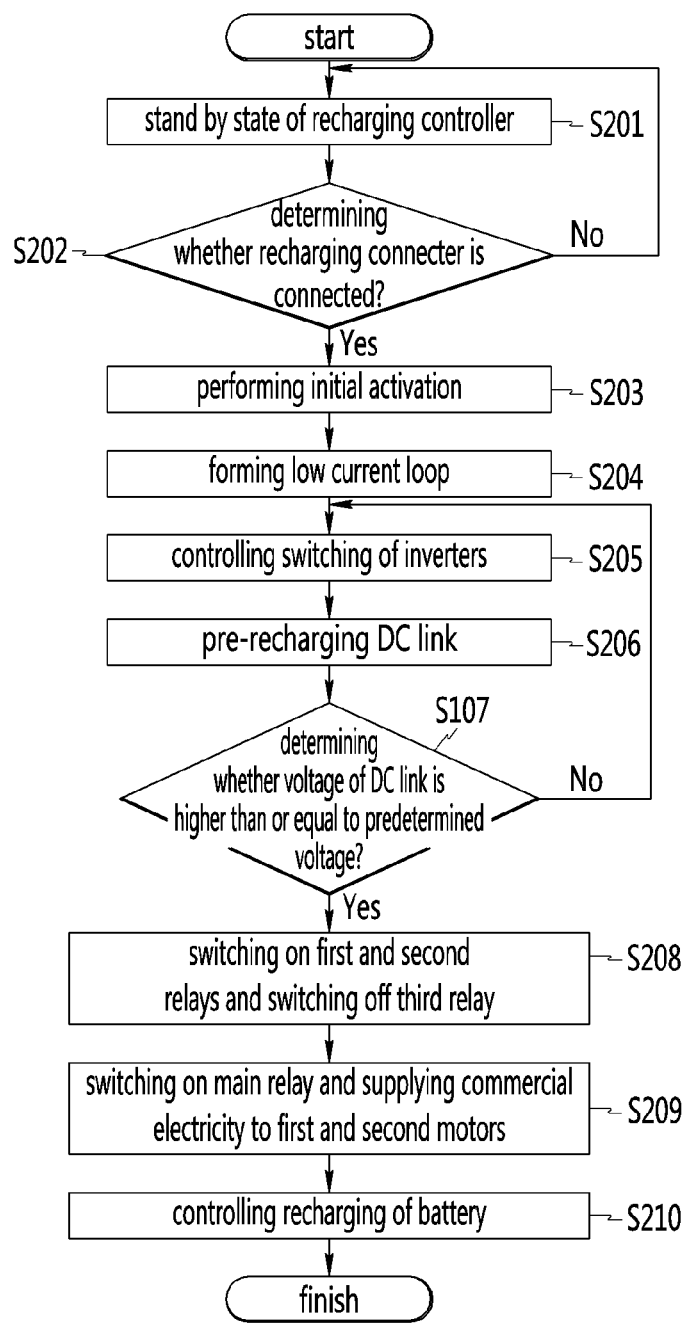

SYSTEM FOR RECHARGING PLUG-IN HYBRID VEHICLE BY CONTROLLING PRE-CHARGE OF A DC LINK

CROSS-REFERENCE TO RELATED APPLICATION

This application claims priority to and the benefit of Korean Patent Application No. 10-2010-0066376 filed in the Korean Intellectual Property Office on Jul. 9, 2010, the entire contents of which are incorporated herein by reference.

BACKGROUND OF THE INVENTION (a) Field of the Invention

The present invention relates to a plug-in hybrid vehicle, and more particularly to a system for recharging a plug-in hybrid vehicle. In particular, the present system controls pre-recharge of a DC link in a plug-in hybrid vehicle provided with two motors when a high voltage battery is recharged with an exterior AC electricity.

(b) Description of the Related Art

In order to meet tightened exhaust gas regulations on vehicles and to provide enhancement of fuel consumption, hybrid vehicles have been developed.

A hybrid vehicle generates electricity using regenerative braking in which a motor rotates inversely during deceleration and recharges a battery. The hybrid vehicle can also reduce fuel consumption and exhaust gas through ISG (Idle Stop and Go) control. In particular, using ISG, the engine is stopped when the vehicle stops, and the engine is restarted by using the motor when the vehicle begins to run.

In addition, a plug-in recharging method may be applied to the hybrid vehicle. According to the plug-in recharging method, the battery is recharged by using an exterior commercial electricity source.

In order to apply the plug-in recharging method, an on-board charger may be provided to suitably rectify the commercial electricity and slowly recharge the battery. However, such on-board chargers are very expensive and heavy, and thus manufacturing costs of the hybrid vehicle increase and fuel efficiency may be deteriorated. In particular, the cost of an on-board charger is about ten times as expensive as that of an inverter which provides the same output. Thus, manufacturing costs of hybrid vehicles increase excessively and price competitiveness is greatly deteriorated. Further, since the charger is generally mounted in a limited space, it is very difficult to manufacture the charger as a package. In addition, it is desirable to provide a high-speed recharging device that recharges the battery in a short time. In attempts to accomplish this, the commercial electricity source can be connected to a high-speed recharging device. However, the high-speed recharging device must communicate with a high-speed battery controller in real time so as to prevent overcharge of the battery and protect the battery. For this purpose, the high-speed recharging device generally is provided with an additional communication channel. However, in a case that the communication channel of an exterior system is connected to controllers in the hybrid vehicle, it is difficult to provide a reliable controller.

Further, since a voltage of a DC link is 0V, in situations when the battery is recharged through the plug-in recharging method, the commercial electricity source of high voltage is connected to an inverter. As a result, initial inrush current may occur to thereby damage electric switching elements of the inverter.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a system for recharging a plug-in hybrid vehicle. The present system prevents the occurrence of an inrush current and stabilizes a power system. In particular, the present system controls pre-recharge of a DC link in a case that a connection of a recharging connector for recharging a battery is detected.

A system for recharging a plug-in hybrid vehicle according to an exemplary embodiment of the present invention may include: a battery in which DC voltage is stored; first and second motors operated as an electric motor or a generator; first and second inverters for operating the first and second motors respectively; a voltage converter for raising or lowering the DC voltage of the battery such that the raised or lowered DC voltage is supplied to the first and second inverters, and for raising or lowering DC voltage supplied from the first and second inverters such that the raised or lowered DC voltage is supplied to the battery, wherein the voltage converter is provided with a DC link; a main relay selectively connecting the battery with the voltage converter; a recharging port selectively connected to a commercial electricity source, preferably disposed at an outside of the vehicle; a connection detector disposed at the recharging port for detecting a connection of the commercial electricity source; a recharging relay disposed between the recharging port and the first and second motors for selectively connecting the commercial electricity source to the first and second motors; and a recharging controller for performing an initial activation thereof in a switching-off state of the recharging relay, when the connection of the commercial electricity source is detected, such that the commercial electricity source is prevented from being electrically connected to the first and second motors before the initial activation, wherein the recharging controller pre-charges the DC link with the voltage of the battery by switching off the recharging relay and switching on the main relay when the connection of the commercial electricity is detected.

In a preferred embodiment, the connection detector may detect when a recharging cover of the recharging port is open.

In a preferred embodiment, the recharging controller may detect a connection of the commercial electricity source by using CAN communication or Bluetooth™ communication.

In a preferred embodiment, the recharging controller may recharge the battery by switching on the recharging relay when the DC link is pre-recharged to a voltage higher than or equal to a predetermined voltage.

In an exemplary embodiment, the recharging relay includes: a first relay connected to a first neutral point of the first motor; and a second relay connected to a second neutral point of the second motor.

A system for recharging a plug-in hybrid vehicle according to another exemplary embodiment of the present invention may include: a battery in which DC voltage is stored; first and second motors operated as an electric motor or a generator; first and second inverters for operating the first and second motors respectively; a voltage converter for raising or lowering the DC voltage of the battery such that the raised or lowered DC voltage is supplied to the first and second inverters, and for raising or lowering DC voltage supplied from the first and second inverters such that the raised or lowered DC voltage is supplied to the battery, wherein the voltage converter is provided with a DC link; a main relay for selectively connecting the battery with the voltage converter; a recharging port selectively connected to a commercial electricity source, preferably disposed at an outside of the vehicle; a connection detector disposed at the recharging port for detecting a connection of the commercial electricity source; a recharging relay disposed between the recharging port and the first and second motors so as to selectively connect the commercial electricity source to the first and second motors, and so as to form a low current loop under a predetermined condition; and a recharging controller for performing an initial activation thereof in a switching-off state of the recharging relay, when the connection of the commercial electricity source is detected, such that the commercial electricity source is prevented from being electrically connected to the first and second motors before the initial activation, wherein the recharging controller forms the low current loop so as to pre-recharge the DC link by using electricity of the low current loop when the initial activation is completed.

In accordance with a preferred embodiment, the recharging relay may include: a first relay connected to the first motor; a second relay connected to the second motor; and a third relay connected in parallel with the first relay and connected in series with an initial recharging resistance so as to form the low current loop.

In a preferred embodiment, the low current loop may be formed by switching off the first relay, switching on the second relay, and switching on the third relay.

In accordance with a preferred embodiment, the recharging controller may recharge the battery by switching on the first relay, switching off the third relay, and switching on the main relay when the DC link is pre-charged to a voltage higher than or equal to a predetermined voltage.

In a preferred embodiment, the recharging relay may further include a fourth relay connected in parallel with the second relay and connected in series with an initial recharging resistance.

In accordance with a preferred embodiment, the connection detector may detect when a recharging cover of the recharging port is open.

In a preferred embodiment, the recharging controller may detect the connection of the commercial electricity source by using CAN communication or Bluetooth communication.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 4 is a flowchart showing a control of a system for recharging a hybrid vehicle according to the exemplary embodiment of FIG. 4.

DESCRIPTION OF SYMBOLS

Figure 1:
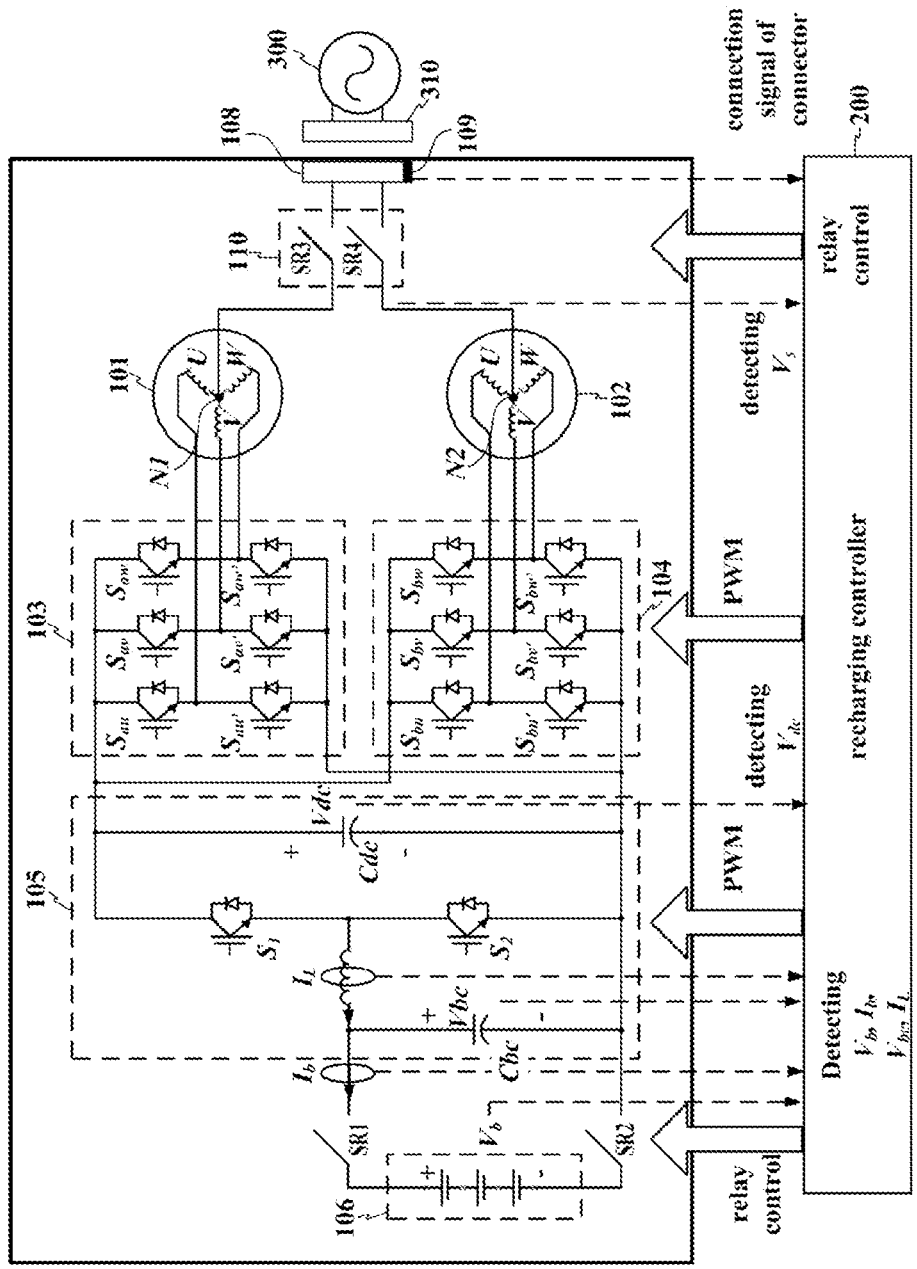
FIG. 1 is a circuit diagram of a system for recharging a hybrid vehicle according to a first exemplary embodiment of the present invention.

| 101: first motor | 102: second motor |
|---|---|
| 103: first inverter | 104: second inverter |
| 105: voltage converter | 106: battery |
| 108: recharging port | 109: connection detector |
| 110: recharging relay | |

DETAILED DESCRIPTION OF THE EMBODIMENTS

Hereinafter, a first and second exemplary embodiment of the present invention will be described in detail referring to the drawings.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

(First Exemplary Embodiment)

FIG. 1 is a circuit diagram of a system for recharging a hybrid vehicle according to the first exemplary embodiment of the present invention. Referring to FIG. 1, the first exemplary embodiment of the present invention includes a first motor 101, a second motor 102, a first inverter 103, a second inverter 104, a voltage converter 105, a battery 106, a recharging port 108, a connection detector 109, main relays SR1 and SR2, a recharging relay 110, and a recharging controller 200.

In accordance with this embodiment, the first motor 101 is a 3-phase AC electric motor, and it is operated as an electric motor which can start an engine (not shown), and is also selectively operated as a generator driven by the engine.

The first motor 101 is operated by 3-phase AC voltage supplied through the first inverter 103 so as to start the engine. In addition, the first motor 101 is driven by the engine so as to generate 3-phase AC voltage and output the 3-phase AC voltage to the first inverter 103.

The second motor 102 is a 3-phase AC electric motor that drives a driving wheel (not shown) and generates driving torque by 3-phase AC voltage supplied from the second inverter 104.

The second motor 102 is operated as a generator during regenerative braking of the vehicle so as to generate 3-phase AC voltage, and outputs the 3-phase AC voltage to the second inverter 104.

In accordance with this exemplary embodiment, the first motor 101 includes a 3-phase stator coil. As shown, U, V, and W phase coils forming the 3-phase stator coil are respectively provided with one end connected to each other so as to form a first neutral point N1, and the other end connected to a corresponding arm of the first inverter 103.

The first neutral point N1 of the first motor 101 is in connection with the commercial electricity source 300 which is exterior the vehicle.

According to this exemplary embodiment, the second motor 102 also includes a 3-phase stator coil. As shown, U, V, and W phase coils forming the 3-phase stator coil are respectively provided with one end connected to each other so as to form a second neutral point N2, and the other end connected to a corresponding arm of the second inverter 104.

The second neutral point N2 of the second motor 102 is also in connection with the commercial electricity 300 source, which is exterior the vehicle.

As shown, the first inverter 103 is formed by connecting electric switching elements in series, and includes U phase arms Sau and Sau', V phase arms Sav and Sav', and W phase arms Saw and Saw'.

Any conventional electric switching elements can be suitably used in the present invention, and in accordance with preferred embodiments, one of an NPN transistor, an IGBT (Insulated Gate Bipolar Transistor), and an MOSFET are used as the electric switching element.

The first inverter 103 converts the DC voltage of the battery 106 supplied through the voltage converter 105 into the 3-phase AC voltage according to a PWM signal applied from the recharging controller 200 to each arm, and supplies the 3-phase AC voltage to the first motor 101 as a driving voltage.

As further shown in FIG. 1, the second inverter 104 is formed by connecting electric switching elements in series, and includes U phase arms Sbu and Sbu', V phase arms Sbv and Sbv', and W phase arms Sbw and Sbw'.

Again, any conventional electric switching elements can be suitably used in the present invention, and in accordance with preferred embodiments, one of an NPN transistor, an IGBT (Insulated Gate Bipolar Transistor), and an MOSFET are used as the electric switching element.

The second inverter 104 converts the DC voltage of the battery 106 supplied through the voltage converter 105 into the 3-phase AC voltage according to a PWM signal applied from the recharging controller 200 to each arm, and supplies the 3-phase AC voltage to the second motor 102 as a driving voltage.

In a case that the commercial electricity 300 supplied to the first inverter 103 through the first neutral point N1 of the first motor 101 has positive (+) phase (Vs>0), an upper arm of the first inverter 103 becomes electrified by the PWM signal supplied from the recharging controller 200 to each arm, and supplies a charging current to a DC link (a portion to which Vdc is applied). At this time, a lower arm of the second inverter 104 becomes electrified by the PWM signal supplied from the recharging controller 200 to each arm, and is connected to the commercial electricity source 300 through the second neutral point N2 of the second motor 102. As a result, in a case that the commercial electricity source 300 having positive phase (Vs>0) is input, a current loop of the first neutral point N1 of the first motor 101→the upper arm of the first inverter 103→the DC link→the lower arm of the second inverter 104→the second neutral point N2 of the second motor 102→the commercial electricity source 300 is formed so as to supply the charging current to the DC link.

Alternatively, in a case that the commercial electricity source 300 supplied to the second inverter 104 through the second neutral point N2 of the second motor 102 has negative (−) phase (Vs<0), an upper arm of the second inverter 104 becomes electrified by the PWM signal supplied from the recharging controller 200 to each arm, and supplies the charging current to the DC link. At this time, a lower arm of the first inverter 103 becomes electrified by the PWM signal supplied from the recharging controller 200 to each arm, and is connected to the commercial electricity 300 through the first neutral point N1 of the first motor 101. As a result, in a case that the commercial electricity source 300 having negative phase (Vs<0) is input, a current loop of the second neutral point N2 of the second motor 102→the upper arm of the second inverter 104→the DC link→the lower arm of the first inverter 103→the first neutral point N1 of the first motor 101→the commercial electricity 300 is formed so as to supply the charging current to the DC link.

According to this exemplary embodiment, the voltage converter 105 is a DC/DC converter, and it raises or lowers the DC voltage supplied from the battery 106 to a voltage of predetermined level according to a PWM duty control signal applied from the recharging controller 200, and outputs the voltage to the first inverter 103 or the second inverter 104. In addition, the voltage converter 105 raises or lowers the DC voltage recharged at the DC link according to a PWM duty control signal applied from the recharging controller 200, and outputs the voltage to the battery 106 as a recharging voltage.

In accordance with this embodiment, the voltage converter 105 is in connection with both ends of the battery 106, and includes first and second electric switching elements S1 and S2 connected in series with a DC link capacitor Cdc and a smoothing capacitor Cbc for smoothing a voltage change between both ends of the battery 106.

According to this embodiment, the battery 106 provides DC electricity. For example, a nickel-hydrogen or a lithium-ion rechargeable battery, and a capacitor of large capacity, may be used as the battery 106. The DC voltage recharged in the voltage converter 105 is raised or lowered so as to be supplied to the first motor 101 or the second motor 102.

In addition, the battery 106 is recharged by the exterior commercial electricity source 300, which is raised or lowered by the voltage converter 105 and is supplied to the battery 106.

As shown in FIG. 1, the recharging port 108 is connected to a recharging port 310 of the exterior commercial electricity source 300 through any conventional means. A connection detector 109 may further be provided to detect when the commercial electricity source 300 is in connection with the recharging port 108, and can further transmit information corresponding thereto to the recharging controller 200. In an exemplary embodiment, the connection detector 109 may be a cover open detector which detects if a cover of the recharging port is open. In preferred embodiments, connection of the connector (which connects the recharging ports 108 and 310) may be detected by communication between the recharging port 108 and a recharging stand (which can be in accordance with conventional recharging stands) for supplying the commercial electricity. In such embodiments, communication between the recharging port 108 and the recharging stand can be accomplished by various means, including for example, wire communication and wireless communication including CAN communication, Bluetooth communication.

In a case that the connection detector 109 detects that the cover of the recharging port 108 is open, the aim or signal of recharging the battery 106 may then be transmitted to the recharging controller 200 before the commercial electricity source 300 is electrically connected to the first neutral point N1 of the first motor 101 and the second neutral point N2 of the second motor 102.

As shown in FIG. 1, the main relays SR1 and SR2 are in connection with both ends of the battery 106, and control voltage and current input to or output from the battery 106.

As shown, the recharging relay 110 can be disposed between the recharging port 108 and the first and second motors 101 and 102 so as to connect or disconnect the commercial electricity source 300 supplied to the first neutral point N1 of the first motor 101 and the second neutral point N2 of the second motor 102. In particular, the recharging relay 110 can include a first relay SR3 connected to the first neutral point N1 of the first motor 101 and a second relay SR4 connected to the second neutral point N2 of the second motor 102.

The recharging relay 110 is switched on or off according to a control of the recharging controller 200. In a case that the connection of the recharging connector to the recharging port 108 is detected, the recharging relay 110 prevents the commercial electricity source 300 from supplying electricity in the system until an initial activation of the recharging controller 200 and pre-recharging of the DC link are completed. Therefore, stability of the system may be secured.

In accordance with the present invention, the commercial electricity source 300 may supply AC electricity or DC electricity.

In a case that the connection of the recharging connector to the recharging port 108 is detected, the recharging controller 200 recognizes this as the aim or signal for recharging the battery 106. In this case, the recharging controller 200 prevents the commercial electricity source 300 from supplying electricity in the system by switching off the recharging relay 110 and performing the initial activation. As such, stability of the system is enhanced.

After performing the initial activation, the recharging controller 200 switches on the main relay SR1 and SR2 so as to pre-recharge the DC link to a voltage of predetermined level with the battery 106. Therefore, occurrence of inrush current may be prevented and electric switching elements may further be protected when the commercial electricity source 300 supplies electricity.

In accordance with the present invention, various procedures such as driving the first motor by the battery voltage and starting the engine, recharging the battery by the voltage generated by the driving torque of the engine, driving the second motor by the battery voltage and running the vehicle, and recharging the battery through the regenerative braking, can be in accordance with conventional procedures, and, thus, detailed descriptions of such conventional procedures will be omitted.

The first exemplary embodiment of the present invention, as described and shown in FIG. 1, relates to control of the initial activation and pre-recharging of the DC link when the aim or signal for recharging the battery is detected. This embodiment will be described in further detail in connection with FIG. 2 which is a flowchart showing a control of a system for recharging a hybrid vehicle according to the first exemplary embodiment of the present invention.

Figure 2:
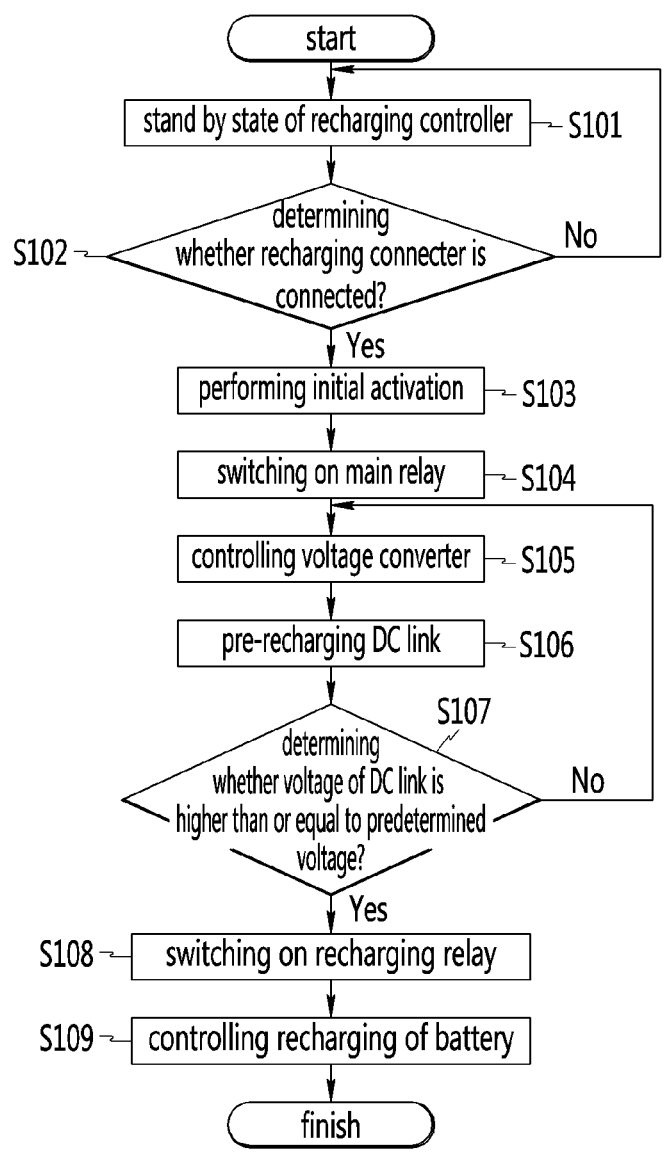
FIG. 2 is a flowchart showing a control of a system for recharging a hybrid vehicle according to the exemplary embodiment of FIG. 1.

Referring to FIG. 2, in a state that the recharging controller 200 of the hybrid vehicle according to the first exemplary embodiment of the present invention stands by (step S101), it is then determined whether the recharging connector (recharging stand) is connected to the recharging port 108 by analyzing a signal of the connection detector 109 mounted at the recharging port 108 at (step S102).

For example, in some embodiments the connection of the recharging connector (recharging stand) may be detected when the cover of the recharging port 108 is open or by communication with the recharging stand through wire communication or wireless communication.

If the connection of the recharging connector (recharging stand) is detected at step S102, the recharging controller 200 determines or detects that the aim or conditions for recharging the battery 106 exist and performs the initial activation. In particular, initial activation is preformed when the recharging relay 110 is maintained in a switched off state (step S103).

If the initial activation of the recharging controller 200 is completed, the recharging controller 200 switches on the main relay SR1 and SR2 so as to output the voltage of the battery 106 to the voltage converter 105 (step S104).

At this time, the recharging controller 200 outputs the PWM signal to the voltage converter 105 so as to switch on or off the first electric switching element S1 and the second electric switching element S2 (step S105).

Therefore, the voltage output from the battery 106 is raised by switching operation of the first electric switching element S1 and the second electric switching element S2 on or off, and charging the capacitor Cdc of the DC link. Therefore, the pre-recharge of the DC link is performed (step S106).

The voltage of the DC link recharged by the voltage of the battery 106 is then detected, and it is determined whether the voltage of the DC link is higher than or equal to a predetermined voltage V1 (step S107).

If the voltage of the DC link is lower than the predetermined voltage V1 at step S107, the control of the system is returned to step S105 and the pre-recharging is continued. On the other hand, if the voltage of the DC link is higher than or equal to the predetermined voltage V1 at step S107, the recharging relay 110 is switched on (step S108).

As shown, the commercial electricity 300 connected to the recharging port 108 is supplied to the first neutral point N1 of the first motor 101 and the second neutral point N2 of the second motor 102, and thus a current path is formed by switching the arms of the first inverter 103 and the second inverter 104 on or off corresponding to the phase of the commercial electricity source 300. In addition, the first electric switching element S1 and the second electric switching element S2 in the voltage converter 105 are switched on or off so as to recharge the battery 106.

In a case that it is detected that the recharging connector (recharging stand) is connected to the hybrid vehicle provided with a double motor system, the initial activation of the recharging controller is firstly performed and the DC link is pre-recharged by the voltage of the battery according to the first exemplary embodiment of the present invention. Therefore, the inrush current according to supply of the commercial electricity does not occur and the system may be stabilized.

(Second Exemplary Embodiment)

Figure 3:
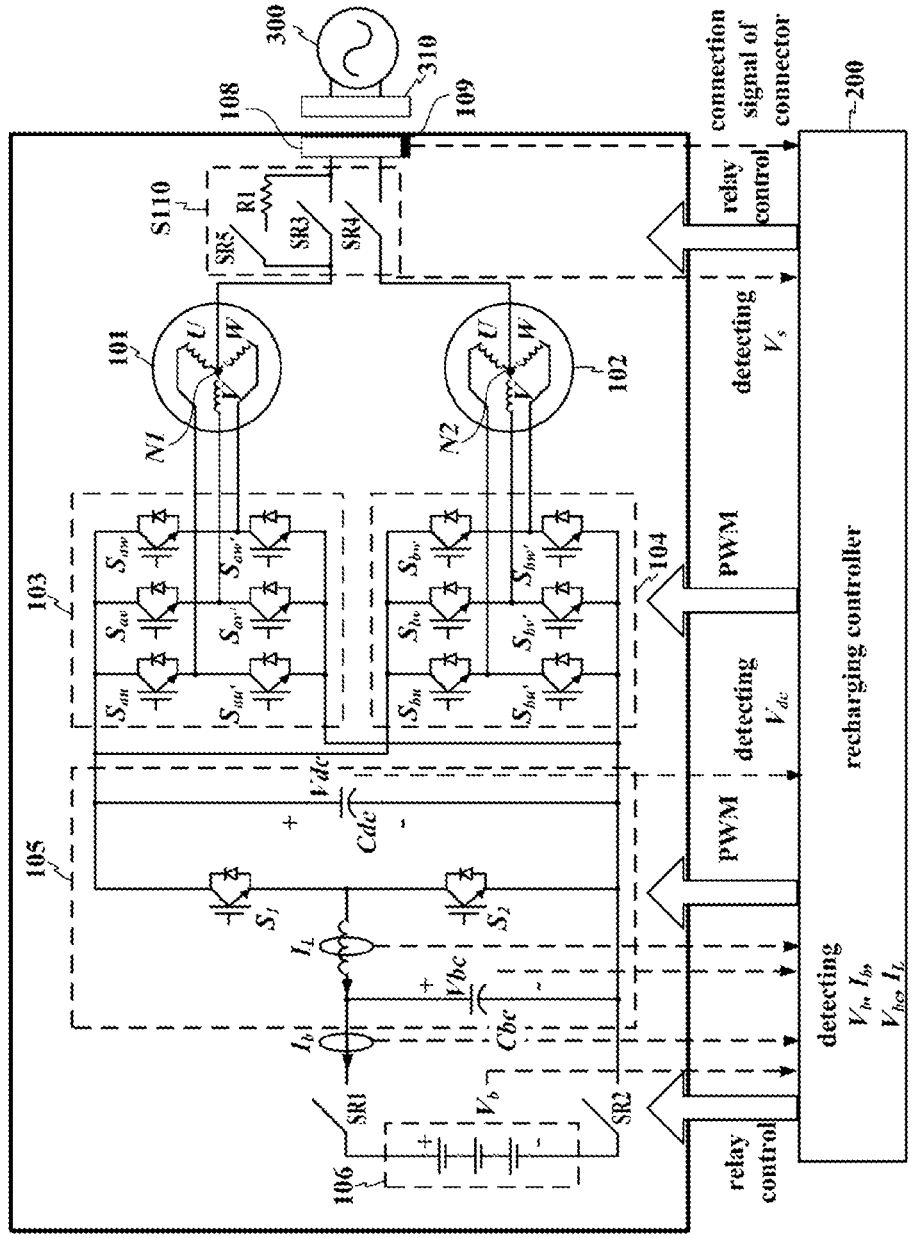
FIG. 3 is a circuit diagram of a system for recharging a hybrid vehicle according to second exemplary embodiment of the present invention.

FIG. 3 is a circuit diagram of a system for recharging a hybrid vehicle according to the second exemplary embodiment of the present invention.

Referring to FIG. 3, the second exemplary embodiment of the present invention includes a first motor 101, a second motor 102, a first inverter 103, a second inverter 104, a voltage converter 105, a battery 106, a recharging port 108, a connection detector 109, a main relay SR1 and SR2, a recharging relay 110, and a recharging controller 200.

According to this embodiment, the first motor 101 is a 3-phase AC electric motor, and is operated as an electric motor which can start an engine (not shown), and is further selectively operated as a generator driven by the engine.

As shown, the first motor 101 is operated by 3-phase AC voltage supplied through the first inverter 103 so as to start the engine. In addition, the first motor 101 is driven by the engine so as to generate 3-phase AC voltage, and output the 3-phase AC voltage to the first inverter 103.

The second motor 102 is also a 3-phase AC electric motor that drives a driving wheel (not shown) and generates driving torque by 3-phase AC voltage supplied from the second inverter 104.

The second motor 102 is operated as a generator during regenerative braking of the vehicle so as to generate 3-phase AC voltage, and outputs the 3-phase AC voltage to the second inverter 104.

In accordance with this exemplary embodiment, the first motor 101 includes a 3-phase stator coil. As shown, U, V, and W phase coils forming the 3-phase stator coil are respectively provided with one end connected to each other so as to form a first neutral point N1 and the other end connected to a corresponding arm of the first inverter 103. The first neutral point N1 of the first motor 101 is in connection with the commercial electricity source 300 which is exterior the vehicle.

According to this exemplary embodiment, the second motor 102 also includes a 3-phase stator coil. As shown, U, V, and W phase coils forming the 3-phase stator coil are respectively provided with one end connected to each other so as to form a second neutral point N2 and the other end connected to a corresponding arm of the second inverter 104.

The second neutral point N2 of the second motor 102 is also in connection with the commercial electricity source 300 which is exterior the vehicle.

As shown, the first inverter 103 is formed by connecting electric switching elements in series, and includes U phase arms Sau and Sau', V phase arms Sav and Sav', and W phase arms Saw and Saw'.

Any conventional electric switching elements can be suitably used in the present invention, and in accordance with preferred embodiments, one of an NPN transistor, an IGBT (Insulated Gate Bipolar Transistor), and an MOSFET may be used as the electric switching element.

The first inverter 103 converts the DC voltage of the battery 106 supplied through the voltage converter 105 into the 3-phase AC voltage according to a PWM signal applied from the recharging controller 200 to each arm, and supplies the 3-phase AC voltage to the first motor 101 as a driving voltage.

As further shown, the second inverter 104 is formed by connecting electric switching elements in series, and includes U phase arms Sbu and Sbu', V phase arms Sbv and Sbv', and W phase arms Sbw and Sbw'.

Again, any conventional electric switching elements can be suitably used in the present invention, and in accordance with preferred embodiments, one of an NPN transistor, an IGBT (Insulated Gate Bipolar Transistor), and an MOSFET may be used as the electric switching element.

The second inverter 104 converts the DC voltage of the battery 106 supplied through the voltage converter 105 into the 3-phase AC voltage according to a PWM signal applied from the recharging controller 200 to each arm, and supplies the 3-phase AC voltage to the second motor 102 as a driving voltage.

In a case that the commercial electricity 300 supplied to the first inverter 103 through the first neutral point N1 of the first motor 101 has positive (+) phase (Vs>0), an upper arm of the first inverter 103 becomes electrified by the PWM signal supplied from the recharging controller 200 to each arm, and supplies a charging current to a DC link (a portion to which Vdc is applied). At this time, a lower arm of the second inverter 104 becomes electrified by the PWM signal supplied from the recharging controller 200 to each arm and is connected to the commercial electricity source 300 through the second neutral point N2 of the second motor 102. As a result, in a case that the commercial electricity 300 having positive phase (Vs>0) is input, a current loop of the first neutral point N1 of the first motor 101→the upper arm of the first inverter 103→the DC link→the lower arm of the second inverter 104→the second neutral point N2 of the second motor 102→the commercial electricity source 300 is formed so as to supply the charging current to the DC link.

Alternatively, in a case that the commercial electricity source 300 supplied to the second inverter 104 through the second neutral point N2 of the second motor 102 has negative (−) phase (Vs<0), an upper arm of the second inverter 104 becomes electrified by the PWM signal supplied from the recharging controller 200 to each arm and supplies the charging current to the DC link. At this time, a lower arm of the first inverter 103 becomes electrified by the PWM signal supplied from the recharging controller 200 to each arm and is connected to the commercial electricity source 300 through the first neutral point N1 of the first motor 101. As a result, in a case that the commercial electricity source 300 having negative phase (Vs<0) is input, a current loop of the second neutral point N2 of the second motor 102→the upper arm of the second inverter 104→the DC link→the lower arm of the first inverter 103→the first neutral point N1 of the first motor 101→the commercial electricity source 300 is formed so as to supply the charging current to the DC link.

According to a preferred embodiment, the voltage converter 105 is a DC/DC converter, and it raises or lowers the DC voltage supplied from the battery 106 to a voltage of predetermined level according to a PWM duty control signal applied from the recharging controller 200, and outputs the voltage to the first inverter 103 or the second inverter 104. Further, the voltage converter 105 raises or lowers the DC voltage recharged at the DC link according to a PWM duty control signal applied from the recharging controller 200 and outputs it to the battery 106 as a recharging voltage.

As shown, the voltage converter 105 is in connection with both ends of the battery 106, and includes first and second electric switching elements S1 and S2 connected in series with a DC link capacitor Cdc and a smoothing capacitor Cbc for smoothing a voltage change between both ends of the battery 106.

According to this embodiment, the battery 106 provides DC electricity. For example, a nickel-hydrogen or a lithium-ion rechargeable battery, and a capacitor of large capacity, may be used as the battery 106. The DC voltage recharged in the voltage converter 105 is raised or lowered so as to be supplied to the first motor 101 or the second motor 102.

In addition, the battery 106 can be further recharged by the exterior commercial electricity source 300 which is raised or lowered by the voltage converter 105 and is applied to the battery 106.

As shown, the recharging port 108 is connected to a recharging port 310 of the exterior commercial electricity source 300, for example through any conventional means.

A connection detector 109 can be further provided for detecting a connection between the commercial electricity source 300 and the recharging port 108, and for transmitting information corresponding thereto to the recharging controller 200. In an preferred embodiment, the connection detector 109 may be a cover open detector which detects if a cover of the recharging port is open. In a further preferred embodiment, connection of the connector (connecting the recharging port 108 and electricity source 300) may be detected by communication between the recharging port 108 and a recharging stand (which can be in accordance with conventional recharging stands) for supplying the commercial electricity.

In such embodiments, communication between the recharging port 108 and the recharging stand can be accomplished by various means, including for example, wire communication and wireless communication including CAN communication, Bluetooth communication.

In a case that the connection detector 109 detects that the cover of the recharging port 108 is open, the aim or signal of recharging the battery 106 may then be transmitted to the recharging controller 200 before the commercial electricity 300 is electrically connected to the first neutral point N1 of the first motor 101 and the second neutral point N2 of the second motor 102.

As shown in FIG. 3, the main relays SR1 and SR2 are in connection with both ends of the battery 106, and control voltage and current input to or output from the battery 106.

As shown, the recharging relay 110 can be disposed between the recharging port 108 and the first and second motors 101 and 102 so as to connect or disconnect the commercial electricity source 300 supplied to the first neutral point N1 of the first motor 101 and the second neutral point N2 of the second motor 102. Preferably, the recharging relay 110 includes a first relay SR3 connected to the first neutral point N1 of the first motor 101, a second relay SR4 connected to the second neutral point N2 of the second motor 102, and a third relay SR5 connected in parallel with the first relay SR3 and connected in series with an initial recharging resistance R1.

In preferred embodiments, an additional relay may further be connected in parallel with the second relay SR4 and connected in series with the initial recharging resistance According to this embodiment, the recharging relay 110 is switched on or off according to a control of the recharging controller 200. In a case that the connection of the recharging connector to the recharging port 108 is detected, the third relay SR5 connected to the initial recharging resistance R1 and the second relay SR4 are switched on according to a control of the recharging controller 200, and the commercial electricity source 300 is lowered to a low voltage and a low current. The low voltage and the low current are then supplied to the DC link and the pre-recharge of the DC link is performed.

If the pre-recharge of the DC link according to the control of the recharging controller 200 is completed, the recharging relay 110 switches off the third relay SR5 and switches on the first relay SR3 and the second relay SR4. Therefore, the normal commercial electricity source 300 (i.e. electricity supplied directly from the commercial electricity source 300 without modification) supplies electricity to the battery 106 as a recharging voltage.

In accordance with the present invention, the commercial electricity 300 may supply AC electricity or DC electricity.

In a case that the connection of the recharging connector to the recharging port 108 is detected, the recharging controller 200 recognizes this as the aim or confirmation/signal for recharging the battery 106. In this case, the recharging controller 200 switches off the recharging relay 110, so as to stabilize the system, and performs the initial activation.

If the initial activation of the recharging controller 200 is performed, the recharging controller 200 then switches on the third relay SR5 connected to the initial recharging resistance R1 and the second relay SR4 in the recharging relay 110 so as to lower the commercial electricity 300 to a low voltage and pre-recharge the DC link. If the pre-recharge of the DC link is completed, the recharging controller 200 switches off the third relay SR5 and switches on the first relay SR3 and the second relay SR4 so as to supply the normal commercial electricity 300 to the battery 106 and recharge the battery 106.

In accordance with the present invention, various procedures such as driving the first motor by the battery voltage and starting the engine, recharging the battery by the voltage generated by the driving torque of the engine, driving the second motor by the battery voltage and running the vehicle, and recharging the battery through the regenerative braking, can be in accordance with conventional procedures, and, thus, detailed descriptions of such conventional procedures will be omitted.

According to the second exemplary embodiment of the present invention, the DC link is first recharged by the low voltage if the recharging connector is connected. If the pre-recharge of the DC link is completed, the battery is recharged by the normal commercial electricity. The second exemplary embodiment of the present invention will be described in further detail in connection with FIG. 4, which is a flowchart showing a control of a system in accordance with the second exemplary embodiment.

Referring to FIG. 4, in a state that the recharging controller 200 of the hybrid vehicle according to the second exemplary embodiment of the present invention stands by at step S201, the recharging controller 200 analyzes a signal of the connection detector 109 and determines whether the recharging connector connected to the commercial electricity 300 is connected to the recharging port 108 (step S202).

For example, the connection of the recharging connector (recharging stand) may be detected when the cover of the recharging port 108 is open or by communication with the recharging stand such as through wire communication or wireless communication.

If the connection of the recharging connector is detected at step S202, the recharging controller 200 performs the initial activation, wherein the initial activation is preferably performed in a state that the recharging relay 110 is switched off (step S203).

If the initial activation is completed, the recharging controller 200 forms the low current loop by switching on the second relay SR4 of the recharging relay 110 and the third relay SR5 connected in series with the initial recharging resistance R1 and connected in parallel with the first relay SR3 (step S204).

Further, the recharging controller 200 switches the upper and lower arms of the first inverter 103 and the second inverter 104 on or off according to the phase Vs of the commercial electricity source 300, and supplies the electricity of the low current loop formed by the recharging relay 110 to the DC link (step S205).

As such, the DC link is pre-recharged by the electricity supplied through the first inverter 103 and the second inverter 104 (step S206).

If the DC link begins to be pre-recharged, the recharging voltage of the DC link is detected, and it is determined whether the voltage of the DC link is higher than or equal to a predetermined voltage V1 (step S207).

If the voltage of the DC link is higher than or equal to the predetermined voltage at step S207, the recharging controller 200 switches off the third relay SR5 of the recharging relay 110 and switches on the first relay SR3 and the second relay SR4 (step S208). Therefore, the normal commercial electricity source 300 supplies the normal commercial electricity to the first neutral point N1 of the first motor 101 and the second neutral point N2 of the second motor 102 (step S209).

When the DC link in the voltage converter 105 is recharged, the recharging controller 200 controls the first electric switching element S1 and the second electric switching element S2 in the voltage converter 105 by the PWM duty control signal, and recharges the battery 106 (step S210).

In a case that it is detected that the recharging connector (recharging stand) is connected to the hybrid vehicle provided with a double motor system, the DC link is pre-recharged by the low current supplied through the recharging relay according to the second exemplary embodiment of the present invention. Therefore, the inrush current can be prevented and the system may be stabilized.

According to the present invention, in a case that a connection of a recharging connector for recharging a battery is detected, a pre-recharge of a DC link is controlled such that inrush current does not occur by supply of commercial electricity. As such, a power system may be stabilized.

In addition, according to the present invention the battery is recharged by a motor and an inverter provided in a hybrid vehicle. As such, an expensive charger need not be used, and price competitiveness is enhanced.

Still further, the present invention provides high-speed recharging by use of a motor of large capacity and the inverter provided in the hybrid vehicle. As such, according to the present invention, additional components and exterior chargers for high-speed recharge may not be needed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for recharging a plug-in hybrid vehicle, comprising:
   a battery in which an energy having DC voltage is stored;
   first and second motors operated as electric motors or generators, respectively;
   first and second inverters for operating the first and second motors, respectively;
   a voltage converter for raising or lowering the DC voltage of the battery such that the raised or lowered DC voltage is supplied to the first and second inverters, and for raising or lowering DC voltage supplied from the first and second inverters such that the raised or lowered DC voltage is supplied to the battery, wherein the voltage converter is provided with a DC link;
   a main relay for selectively connecting the battery with the voltage converter;
   a recharging port selectively connected to a commercial electricity source external to the vehicle;
   a connection detector disposed at the recharging port configured to detect a connection of the commercial electricity source, and detect when a recharging cover of the recharging port is open;
   a recharging relay disposed between the recharging port and the first and second motors, for selectively connecting the commercial electricity to the first and second motors; and
   a recharging controller configured to:
   detect the connection of the commercial electricity source by using a means for communication,
   in response to a determination that the commercial electricity source is connected, pre-charge the DC link with the voltage of the battery when the recharging relay is switched off and the main relay is switched on,
   perform an initial activation of the recharging controller while the recharging relay is switched off once the connection of the commercial electricity source is detected to prevent the commercial electricity source from being electrically connected to the first and second motors until the initial activation is complete and the DC link is pre-charged to a voltage higher than or equal to a predetermined voltage, and
   switch on the recharging relay once both the initial activation is completed and the DC link is pre-charged to the voltage higher than or equal to the predetermined voltage.

2. The system of claim 1, wherein the recharging relay comprises:
   a first relay connected to a first neutral point of the first motor; and
   a second relay connected to a second neutral point of the second motor.

* * * * *